United States Patent [19]

Hohman et al.

[11] 4,353,725

[45] Oct. 12, 1982

[54] PROCESS AND APPARATUS FOR RECYCLING SCRAP GLASS

[75] Inventors: Charles M. Hohman; William L. Streicher, both of Granville, Ohio

[73] Assignee: Owens-Corning Fiberglas Corporation, Toledo, Ohio

[21] Appl. No.: 246,537

[22] Filed: Mar. 23, 1981

[51] Int. Cl.³ .............................................. C03B 3/00
[52] U.S. Cl. .......................................... 65/27; 65/28; 65/62; 65/134; 209/11; 209/47; 209/129; 209/285; 165/111
[58] Field of Search ...................... 65/27, 28, 62, 134, 65/335; 209/11, 45, 47, 285, 133, 130, 129; 165/111

[56] References Cited

U.S. PATENT DOCUMENTS

| | | | |
|---|---|---|---|
| 2,310,603 | 2/1943 | Taylor | 259/3 |
| 2,872,386 | 2/1959 | Aspegren | 202/136 |
| 3,369,598 | 2/1968 | List | 165/90 |
| 4,099,953 | 7/1978 | Rondeaux et al. | 65/27 X |
| 4,145,202 | 3/1979 | Grodin et al. | 65/134 X |
| 4,188,228 | 12/1980 | Brzozowski | 106/50 |
| 4,207,943 | 6/1980 | Gardner et al. | 165/111 |

FOREIGN PATENT DOCUMENTS

738732 9/1969 Belgium.

OTHER PUBLICATIONS

Heat Transfer by Contact Between Agitated Particles by Bozatli et al.

Primary Examiner—Arthur D. Kellogg
Attorney, Agent, or Firm—Ronald C. Hudgens; Patrick P. Pacella

[57] ABSTRACT

A process and apparatus for recycling scrap glass is disclosed. Removing the binder and preheating the scrap are carried out in one operation. The resulting cleaned, preheated scrap then may be fed directly into a conventional glass melting furnace.

7 Claims, 2 Drawing Figures

PROCESS AND APPARATUS FOR RECYCLING SCRAP GLASS

TECHNICAL FIELD

This invention relates to a process and apparatus for the recycling of scrap glass.

BACKGROUND ART

Methods are known in the art of glass manufacturing for preheating glass batch wherein glass-forming, batch ingredients are brought in direct contact with heated media within a chamber. The particulate or granular glass batch raw materials are brought in particle-particle heat exchange with media that has been heated with an external burner or heated by direct contact with exhaust gases from a glass melting furnace. This method allows the exchange of large quantities of heat economically and uniformly.

Before remelting scrap glass, organic binders and sizes on the surface of the glass must be removed. If this is not done, the glass will enclose the remaining binder in the form of carbon. Upon melting, carbon will reduce the glass. This reduced darkened glass is undesirable for both glass composition and melting.

One method of doing this is to mill the scrap glass and blend it with granular raw batch before charging the batch to the furnace. It is important to ensure that oxidizing conditions are maintained in the glass melt within the furnace so that the glass furnace may feed a fiberizing process without harmful effects.

This process has many inherent disadvantages. For example, the scrap glass must be passed through a shredding operation and stored in a silo before blending with conventional granular batch. Further, the process demands that an entire glass furnace be kept at oxidizing conditions to ensure that carbonaceous material is removed.

DISCLOSURE OF INVENTION

We have developed a process that provides for recycling scrap glass that includes the steps of removing binders or sizes from the scrap glass, preheating the scrap glass and feeding the heated scrap directly into a furnace which feeds a fiberizing process. Binder removal and preheating of the scrap glass are carried out in a rotatable, cylindrical drum. The preheated scrap glass may be fed directly into a furnace with conventional batch or agglomerate feeding. The scrap recycle provides a method of remelting scrap glass with minimal modification to a conventional process for melting glass. The drum removes organic binder and preheats the scrap in one operation with little or no handling of the scrap prior to melting.

BEST MODE OF CARRYING OUT INVENTION

Our invention includes durable heat transfer media formed of glass batch agglomerates, glass, ceramic, steel, stainless steel, aluminum, gravel or the like.

Figure 1:
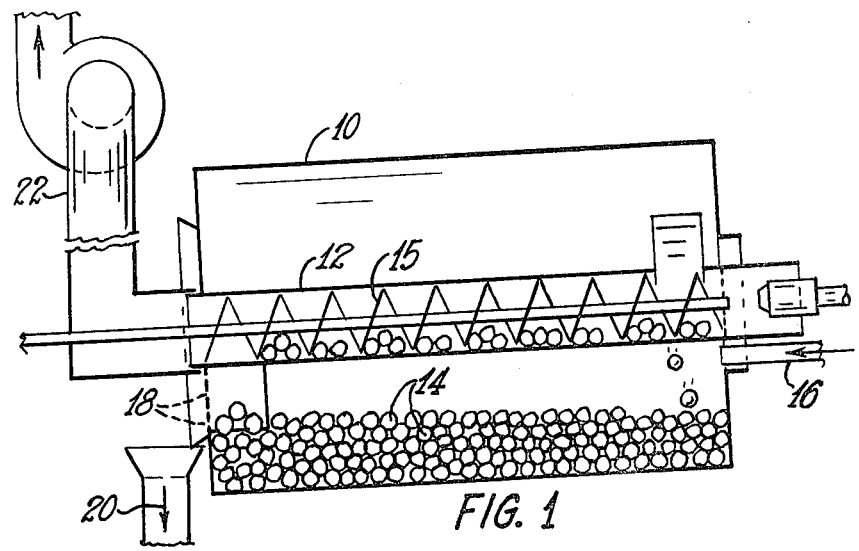
FIG. 1 illustrates the rotary drum of this invention in more detail.

As shown in FIG. 1, this invention utilizes a rotary drum 10 with a firing tube 12 in the center. Inside drum 10 is heat transfer media 14. Heat transfer media 14 moves up firing tube 12 by way of a spiral flight 15. Media 14 then is discharged into the outer portion of drum 10 at the hot end of the drum. Scrap glass is introduced through scrap feed 16 at the same end of the drum (hot end) and moves in parallel flow with media 14 in the outer portion of drum 10. In this manner, the media constantly is recycled within drum 10 for maximum heat transfer efficiency. The scrap is reduced in particle size by the tumbling action of media 14 as drum 10 rotates. The binder is oxidized from the surface of the fiber in the hot environment. At the same time, the hot environment perheats the scrap. At the cold end of drum 10, the preheated scrap overflows from discharge 18 and is fed to a glass melting furnace via stream 20. The scrap glass stream when discharged, is a free flowing material in the range of 10 to 300 mesh material. The tumbling action and the heating cycle in the drum results in breaking up each individual fiber into small independent particles of glass where the glass surface has been cleaned of all organic binder. Media 14 is recycled back through firing tube 12 where it is heated with furnace exhaust gases or gases from a burner. Spent exhaust gases are vented from drum 10 at its cold end via stream 22.

Heat transfer media 14 may be heated with flue gases at a temperature normally ranging from 1000° to 1500° F. (538° to 816° C.) depending upon the softening point of the glass. A blower or fan (not shown) may pull the exhaust gases through firing tube 12. The media may be heated to a temperature at or near the temperature of the flue gases depending upon the resonance time of media 14 in tube 12.

Figure 2:
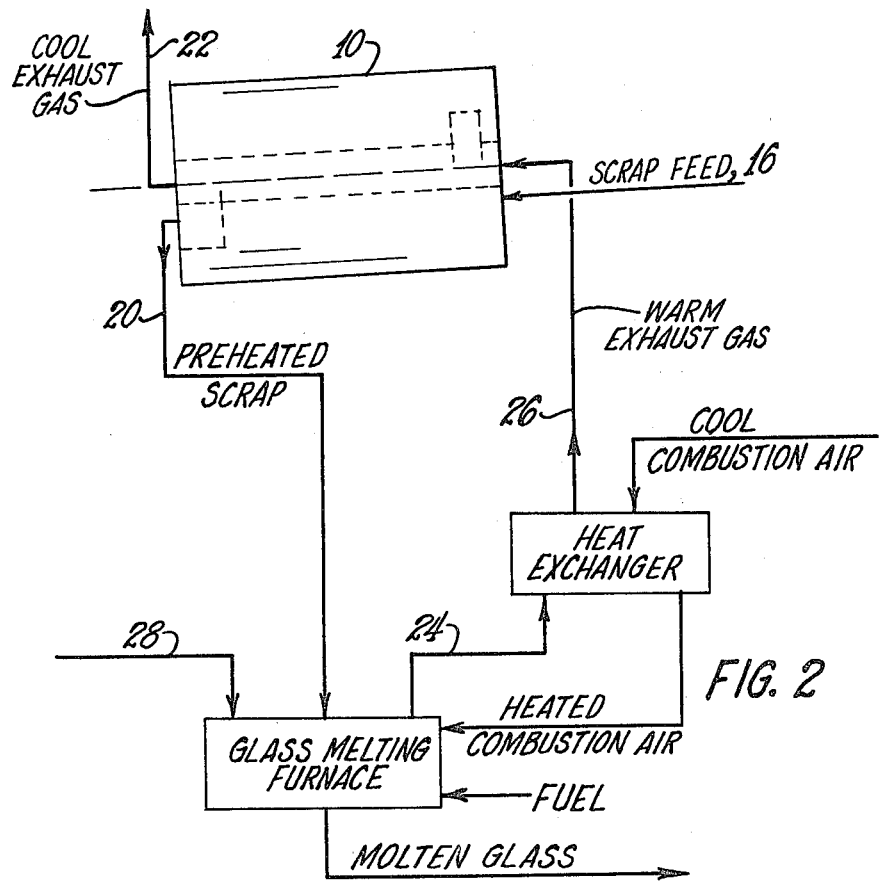
FIG. 2 is a flow diagram of the rotary drum in connection with a conventional glass melting furnace.

As shown in FIG. 2, hot exhaust gas 24 from a glass melting furnace is passed through a heat exchanger prior to entering drum 10 as stream 26.

Conventional batch is fed to the furnace via stream 28. In an embodiment not shown, the conventional batch may be blended with stream 20 and then fed to the glass melting furnace as a mixture with the scrap. The conventional batch may be particulate or granular in form or may be an agglomerated form such as pellets. Either form may be preheated with furnace exhaust gases.

We have found that scrap glass preferably may contribute 5 to 50 percent by weight of the total glass batch in the production furnace, preferably 5 to 25 percent.

In an embodiment not shown in the drawings, the preheating of the media may take place outside the cylindrical drum. Heat transfer media may be heated with flue gases from a glass melting furnace in a preheat hopper. The flue gases are introduced into the lower part of the preheat hopper and the media is introduced into the upper part of the preheat hopper. The flow of gases and media are countercurrent to each other. The media exits through the bottom of the preheat hopper and the flue gases exit through the top of the preheat hopper. A blower or fan may be used to pull the exhaust gases from the preheat hopper or to maintain a negative pressure in the hopper. The media may be heated to a temperature at or near the temperature of the flue gases. The hot media then is fed to one end of the heat exchange drum by a conveyor. Scrap is introduced at the same end of the drum (hot end) and moves in parallel flow with the media in the drum. The tumbling action and the heating cycle in the drum results in cleaning the glass and heating it as the media heats the scrap and strips its binder during contact in the rotating drum.

Naturally, in this embodiment, the inner shell and aperture (firing tube and spiral flight) are not needed.

INDUSTRIAL APPLICABILITY

In operation, the cylindrical drum typically is inclined at an angle. In the preferred embodiment, the scrap charging end of the container (hot end) is elevated above the cool end. While the angle can vary widely, generally the drum will form an acute angle with a horizontal line no greater than about 45° and typically less than 15°. Preferably, the angle is less than 5°.

The tumbling of the media and scrap occurs through agitation from rotation of the drum. The scrap and media tumble and move over each other as they flow from the high end to the low end of the container. It is while the tumbling of the hot media and scrap occurs that the binder on the scrap is removed and the heating of the scrap takes place.

The drum is rotatable and has the general appearance of a double shell apparatus comprising an inner shell and an outer shell having an annulus therebetween. The inner shell has an aperture therethrough where the heating of the media takes place. The media heats the scrap and strips its binder during contact in the annulus during rotation. Movement of the media through the annulus also serves to recycle the media back to the inner apparatus of the drum.

Preferably, this invention is used for processing scrap of heat-softenable mineral materials such as glass and, more especially, for carrying on continuous processing of mineral material from a batch stage through melting and fining, delivering fine streams of the material, attenuating the streams to fine filaments and packaging the fine filaments automatically.

Fine textile filaments have been produced by attenuating streams of glass from a feeder to fine filaments by winding the filaments upon a collector or tube in package form.

The invention uses a plurality of melting and fining furnaces or units wherein each unit is provided with a plurality of forehearths or forehearth sections each provided with a plurality of stream feeders or bushings arranged to discharge fine streams of glass wherein the feeders are aligned in continuous rectilinear rows and the groups of streams are processed to strands of filaments by automatic winding machines disposed in rows beneath the feeders facilitating continuous operation.

The melting and refining units are particularly adaptable for conditioning glass or other mineral material for forming textile filaments wherein the amount of glass processed per unit of time is greatly increased and advantage taken of high melting rates and the volume production of filaments to reduce the cost of textile filaments.

We claim:

1. A process for producing glass by charging to a melting furnace and melting therein a glass batch, including the steps of simultaneously,
    (1) providing a double shell apparatus comprising an inner shell and an outer shell having an annulus therebetween wherein the inner shell has an aperture therethrough,
    (2) charging heat transfer media to one end of the aperture,
    (3) charging heated gases to the other end of the aperture,
    (4) moving the media and gases past each other in the aperture to heat the media,
    (5) removing heated media from the hot end of the aperture and charging it to the hot end of the annulus,
    (6) charging scrap glass to the hot end of the annulus,
    (7) moving scrap glass and hot media in the same direction through the annulus to remove organic binders or sizes from the scrap glass while simultaneously heating the scrap glass,
    (8) removing the cleaned, heated scrap glass from the cold end of the annulus and feeding it to a glass melting furnace, and
    (9) recycling the cooled media from the cold end of the annulus to the cold end of the aperture.

2. A process according to claim 1 wherein the cooled gases are removed from the apparatus at the cold end of the aperture.

3. A process according to claim 1 wherein the heated gases charged in step (3) are exhaust gases from a glass melting furnace.

4. A process according to claim 1 wherein the apparatus is rotated along an axis substantially parallel to the movement of media and gases through the aperture.

5. A process according to claim 1 wherein step (7) is carried out by tumbling the media and scrap glass over each other.

6. A double shell apparatus for recycling scrap glass comprising:
    (a) an inner shell and an outer shell having an annulus therebetween wherein the inner shell has an aperture therethrough,
    (b) means for charging heat transfer media to one end of the aperture,
    (c) means for charging heated gases to the other end of the aperture,
    (d) means for moving the media and gases past each other in the aperture,
    (e) means for removing heated media from the hot end of the aperture and charging it to the hot end of the annulus,
    (f) means for charging scrap glass to the hot end of the annulus,
    (g) means for moving the scrap glass and media through the annulus,
    (h) means for removing the scrap glass from the cold end of the annulus and feeding it to a glass melting furnace, and
    (i) means for recycling the media from the cold end of the annulus to the cold end of the aperture.

7. Apparatus according to claim 6 wherein the apparatus is rotatably mounted along an axis substantially parallel to the movement of media and gases through the media.

* * * * *